United States Patent
Kim et al.

(10) Patent No.: US 8,446,861 B2
(45) Date of Patent: *May 21, 2013

(54) MULTI-ANTENNA RADIO CHANNEL MEASUREMENT SYSTEM AND METHOD FOR TWO-WAY RADIO CHANNEL MEASUREMENT

(75) Inventors: Myung Don Kim, Daejeon (KR); Jae Joon Park, Daejeon (KR); Won Sop Kim, Daejeon (KR); Heon Kook Kwon, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 403 days.

This patent is subject to a terminal disclaimer.

(21) Appl. No.: 12/746,120

(22) PCT Filed: Nov. 26, 2008

(86) PCT No.: PCT/KR2008/006959
§ 371 (c)(1),
(2), (4) Date: Jun. 3, 2010

(87) PCT Pub. No.: WO2009/072775
PCT Pub. Date: Jun. 11, 2009

(65) Prior Publication Data
US 2010/0271953 A1    Oct. 28, 2010

(30) Foreign Application Priority Data
Dec. 7, 2007   (KR) ........................ 10-2007-0126833

(51) Int. Cl.
*H04B 7/216*   (2006.01)
*H04W 4/00*   (2009.01)
*H04W 24/00*   (2009.01)

(52) U.S. Cl.
USPC ......... 370/328; 370/335; 370/342; 455/456.5

(58) Field of Classification Search
None
See application file for complete search history.

(56) References Cited

U.S. PATENT DOCUMENTS 6,470,057 B1 * 10/2002 Hui et al. ...................... 375/294
2005/0068970 A1   3/2005 Srikrishna et al.

(Continued)

FOREIGN PATENT DOCUMENTS

KR   10-2004-0098768 A   11/2004
KR   10-2005-0117127 A   12/2005

(Continued)

OTHER PUBLICATIONS

International Search Report mailed on Apr. 30, 2009 in International Application No. PCT/KR2008/006959.

(Continued)

*Primary Examiner* — Melanie Jagannathan
(74) *Attorney, Agent, or Firm* — Kile Park Reed & Houtteman PLLC

(57) ABSTRACT

The present invention relates to a multi-antenna radio channel measurement system and method for a two-way radio channel measurement, including: Control & Console Software to select a radio measurement mode, generate a probing signal for measurement, receive input parameters to be measured, and deliver the parameters to a baseband unit; a baseband unit (BBU) to set a transmission/reception frequency band and bandwidth and set a timing using the selected radio measurement mode and the received input parameters; a timing unit to synchronize a time with another radio channel measurement system to generate a transmission/reception synchronization signal, and provide the transmission/reception synchronization signal to the BBU; a transceiver unit (TRXU) to up-convert the probing signal for measurement and down-convert the reception channel signal; and a radio frequency (RF) front-end unit (RFFU) to switch to a suitable antenna according to a timing control signal of the BBU.

11 Claims, 6 Drawing Sheets

U.S. PATENT DOCUMENTS

2006/0019679 A1* 1/2006 Rappaport et al. ......... 455/456.5
2008/0125047 A1* 5/2008 Li et al. ....................... 455/63.1

FOREIGN PATENT DOCUMENTS

| KR | 10-0636385 B1 | 10/2006 |
| KR | 10-0778345 B1 | 11/2007 |
| WO | 01/56239 A2 | 8/2001 |

OTHER PUBLICATIONS

Written Opinion of the International Searching Authority mailed on Apr. 30, 2009 in International Application No. PCT/KR2008/006959.

* cited by examiner

MULTI-ANTENNA RADIO CHANNEL MEASUREMENT SYSTEM AND METHOD FOR TWO-WAY RADIO CHANNEL MEASUREMENT

TECHNICAL FIELD

The present invention relates to a multi-antenna radio channel measurement system and method for two-way radio channel measurement, particularly, to a multi-antenna radio channel measurement system and method which measure a radio channel in a mode selected from among a Time Division Duplex (TDD) mode, a Frequency Division Duplex (FDD), and a simplex measurement mode.

This work was supported by the IT R&D program of MIC/IITA. [2005-S-001-03, Development of Wireless Vector Channel Model for next generation mobile communication]

BACKGROUND ART

A next-generation mobile communication system requires a technology to break from a conventional art limited mainly to a voice service and low-speed data service and to provide a variety of high-speed multimedia services with a high-speed data transmission rate. Various technologies such as broadband frequency use and a method using a multi-antenna have been studied to achieve the high-speed data transmission rate. A system using a multi-antenna is sensitive to a feature of a radio channel in comparison with a single-antenna system in a conventional art. Accordingly, when designing a multi-antenna system, accurately ascertaining the features of a radio channel is extremely important. A next-generation radio communication system using the above-described multi-antenna is expected to be generally used in a city where electric waves are affected by buildings, trees, and the like. Also, a next-generation radio communication system using the above-described multi-antenna is expected to be widely used for radio high-speed data transmission indoors.

In general, a multi-antenna radio channel measurement system, referred to as a Channel Sounder in a conventional art, is simplex measurement system, and is divided into a transmission system and a receiving system. A simplex Channel Sounder in a conventional art measures a radio channel in a place, such as an urban macro or a city like urban micro, and an area where traffic is complex, while moving through a specific route using a moving vehicle. In this instance, to measure a radio channel, multi-antennas for transmission and transmission system are installed in a base station or steel tower relatively higher than surrounding buildings, and multi-antennas for receiving and receiving system are installed in the moving vehicle. Through the measurement method described above, a radio channel emitted in a base station, that is, a change of radio channel in various environments according to a route of a moving vehicle based on a downlink is measured. As opposed to the configuration above, a receiving system and multi-antennas for receiving may be installed in a base station, and a transmission system and multi-antennas for transmission may be installed in a moving vehicle. Through this, a moving vehicle emits an electric wave for measurement while moving through a specific route and a base station collects data of radio channel emitted by a moving vehicle based on an uplink.

However, a simplex radio channel measurement system and method of operating the same in a conventional is required to sequentially operate a downlink and uplink in order to measure the same measurement area, a variety of environments, and a number of routes. For this, a measurement apparatus and antenna are required to be installed in a base station and moving vehicle, respectively, and a downlink measurement is to be performed. After the downlink measurement is complete, the measurement apparatus and antenna of each of the base station and moving vehicle are changed and installed, and an uplink measurement is to be performed. A single measurement path in the same area and environment is measured twice in the system and method described above, which is inefficient and time-consuming and wastes a cost and human resources.

Also, features of radio channel to be measured are frequently changed depending on an environment. In particular, a speed of moving vehicle when measuring an uplink channel is not identical to a speed of moving vehicle when measuring a downlink channel, and thus those channels may not be measured in the same environment. Also, radio channel measurement data of each of the uplink and downlink measured as described above is not measured at the same time, at the same measurement point, and in the same surrounding environment, although a measurement path is the same. Accordingly, it may not be an accurate channel collection data to estimate correlation between data of each of the uplink and downlink.

Thus, a two-way radio channel measurement system is to be established, and a method and system to simultaneously measure an uplink and downlink in a same environment and condition when measuring a radio channel is required. Also, a technical control method and operation method to embody the two-way radio channel measurement system is required.

DISCLOSURE OF INVENTION

Technical Problem

The present invention is disclosed to solve the above-described problems of a conventional art. An aspect of the present invention provides a multi-antenna radio channel measurement system and method for two-way radio channel measurement.

Another aspect of the present invention also provides a multi-antenna radio channel measurement system and method which measure a radio channel in a measurement mode selected from among a Time Division Duplex (TDD) mode, a Frequency Division Duplex (FDD) mode, and a simplex measurement mode.

Another aspect of the present invention also provides a multi-antenna radio channel measurement system and method which measure a two-way radio channel in a FDD mode.

Another aspect of the present invention also provides a multi-antenna radio channel measurement system and method which measure a two-way radio channel in a TDD mode.

Technical Solution

According to an aspect of the present invention, there is provided a multi-antenna radio channel measurement system including: Control & Console Software to select a radio measurement mode, generate a probing signal for measurement, receive input parameters to be measured, and deliver the parameters to BBU; a baseband unit (BBU) to set a transmission/reception frequency band and bandwidth and set a timing using the selected radio measurement mode and the received input parameters so as to perform transmitting the probing signal for measurement and receiving a reception channel signal; a timing unit to synchronize a time with another radio channel measurement system to generate a transmission/reception synchronization signal, and provide the transmission/reception synchronization signal to the BBU; a transceiver unit (TRXU) to up-convert the probing signal for measurement and down-convert the reception channel signal; and a radio frequency (RF) front-end unit (RFFU) to switch to a suitable antenna according to a timing control signal of the BBU.

According to another aspect of the present invention, there is provided a method of measuring a radio channel in a multi-antenna radio channel measurement system including: setting a radio measurement mode by selection; receiving input parameters for measurement; setting a transmission/reception frequency band and bandwidth using the received input parameters; downloading and storing a probing signal for measurement; setting a transmission/reception timing using the received input parameters; and transmitting the probing signal for measurement and receiving and storing a reception channel signal according to the set transmission/reception timing.

MODE FOR THE INVENTION

The embodiments of the present invention are described below by referring to the figures, and when an example embodiment makes the subject matter of the present invention vague unnecessarily, detailed description thereof is omitted.

The present invention relates to a multi-antenna radio channel measurement system which measures a radio channel in a measurement mode selected from among a Time Division Duplex (TDD) mode, a Frequency Division Duplex (FDD) mode, and simplex measurement mode.

Figure 1:
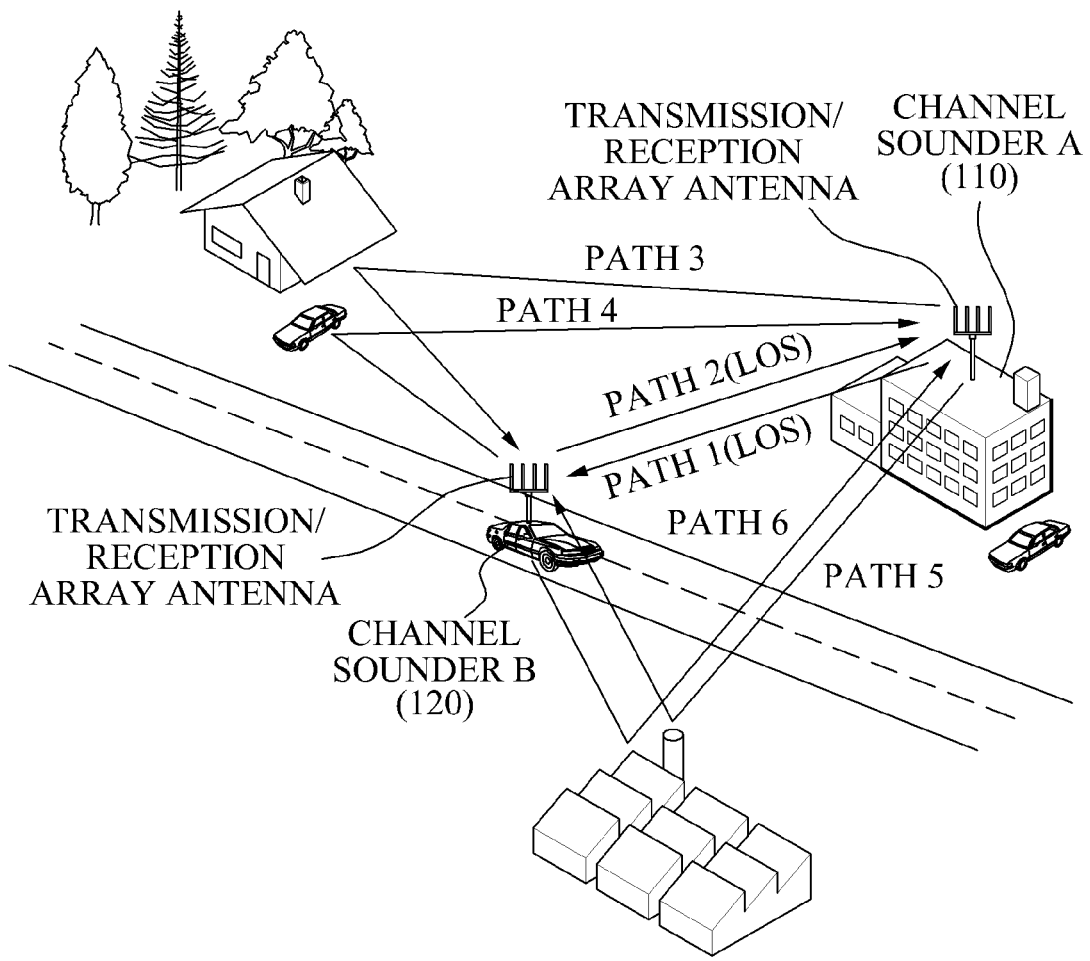
FIG. 1 illustrates a configuration of a multi-antenna radio channel measurement system which measures a two-way radio channel according to an example embodiment of the present invention.

FIG. 1 illustrates a configuration of a multi-antenna radio channel measurement system which measures a two-way radio channel according to an example embodiment of the present invention. Referring to FIG. 1, a two-way radio channel measurement system (Channel Sounder), wherein transmission function and reception function is combined, is embodied and installed in a base station and a moving vehicle, while a moving vehicle moves through a predetermined measurement route, radio channel measurement and data collection is performed. In this instance, each of the Channel Sounders 110 and 120 is a multi-mode and multi-antenna radio channel measurement system which includes both a conventional simplex radio channel measurement method, a simplex measurement mode and a two-way radio channel measurement method, such as the TDD mode and the FDD mode. A configuration of an apparatus in each mode is described below referring to FIGS. 2 and 3.

Figure 2:
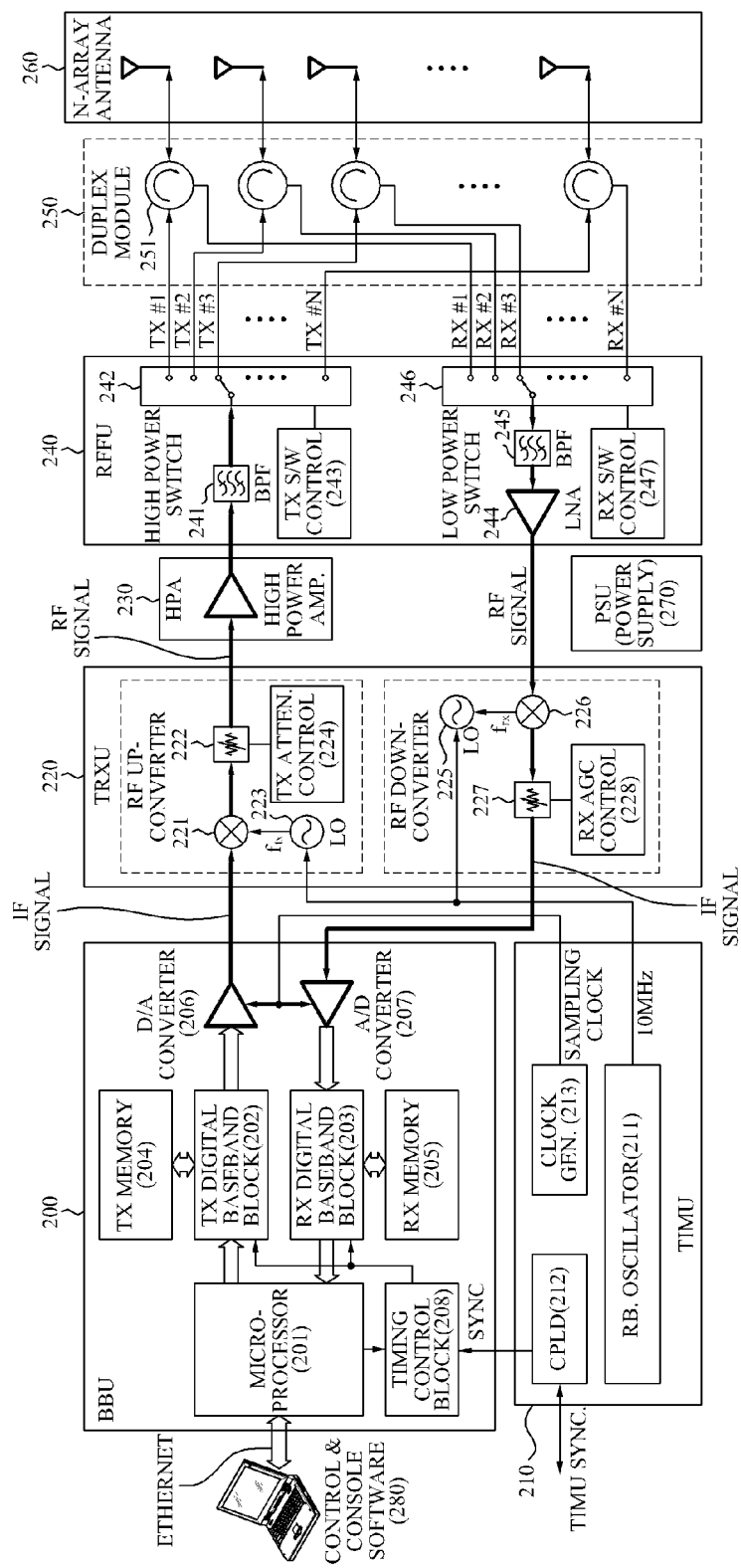
FIG. 2 illustrates a configuration of an apparatus when a two-way radio channel is measured in a Time Division Duplex (TDD) mode in a multi-antenna radio channel measurement system according to an example embodiment of the present invention.

FIG. 2 illustrates a configuration of an apparatus when a two-way radio channel is measured in a TDD mode in a multi-antenna radio channel measurement system according to an example embodiment of the present invention.

Referring to FIG. 2, a multi-antenna radio channel measurement system in the TDD mode of the present invention includes a baseband unit (BBU) 200, a timing unit (TIMU) 210, a transceiver unit (TRXU) 220, a high power amplifier (HPA) 230, radio frequency (RF) front-end unit (RFFU) 240, a duplex module 250, an array antenna (N-Array Antenna) 260, power supply unit (PSU) 270, and Control & Console Software 280.

The BBU 200, an apparatus for performing transmission of a probing signal for measurement in a multi-antenna radio channel measurement system and storing a reception channel signal intended to be measured, includes a microprocessor 201, a transmission (Tx) Digital Baseband block 202, an reception (Rx) Digital Baseband block 203, a Tx memory 204, an Rx memory 205, a digital to analog (D/A) converter 206, an analog to digital (A/D) converter 207, and Timing control block 208.

The microprocessor 201 connects to Control & Console Software 280 through an Ethernet connection, and the like, and controls an operation of a radio channel measurement system according to a command from the Control & Console Software 280. Also, the microprocessor 201 transmits a digital transmission data for channel measurement to the Tx Digital Baseband block 202, and transmits a received channel measurement data in the Rx Digital Baseband block 203 to the Control & Console Software 280. The Tx Digital Baseband block 202 stores the digital data for channel measurement, which is transmitted from the microprocessor 201, and generates a digital probing signal for channel measurement and transmits the same to the D/A converter 206, the digital signal being generated according to a timing signal suitable to the TDD mode and provided from the Timing control block 208. The D/A converter 206 converts a digital signal for transmission into an analog intermediate frequency (IF) signal for transmission and transmits the analog IF signal to the TRXU 220. An input IF signal transmitted from the TRXU 220 is transmitted to the A/D converter 207. The A/D converter 207 performs sampling an analog signal according to a given sampling clock in a given TIMU 210 and converts to a digital data. The converted data is collected by the Rx Digital Baseband block 203, and the collected data is stored in the Rx memory 205.

The Timing control block 208 generates a timing control signal suitable to a transmission/reception timing in the TDD mode based on a timing parameter and a synchronization signal of the TIMU 210, and provides the generated signal respectively to the BBU 200, RFFU 240, and TRXU 220, the timing parameter being provided from the microprocessor 201 and suitable to the TDD mode.

The TIMU 210 includes a Rubidium Oscillator 211 which performs synchronization of a time with a TIMU of another Channel Sounder, a Complex Programmable Logic Device 212 (CPLD), and a Clock Generator 213. Here, the Rubidium Oscillator 211 is a commonly used product with precision within 10 ns, which is capable of synchronizing a self-generated clock with an external input clock, and also is a clock oscillator which is able to generate a 10 MHz of a self synchronizing clock. The CPLD 212 is designed to perform synchronization of time between different TIMUs together with the Rubidium Oscillator 211. A timing synchronization signal is transmitted to the Timing control block 208 of the BBU 200, and thus the signal is used as a basic synchronization signal of a transmission/reception timing in the TDD mode. The Clock Generator 213 generates a synchronized sampling clock together with the Rubidium Oscillator 211 and transmits the generated sampling clock to the D/A converter 206 and A/D converter 207 of the BBU 200.

Referring to FIG. 2, the TRXU 220 is roughly divided into a frequency up converter and a frequency down converter, the up converter including a Tx RF Multiplexer 221, a Tx Variable Attenuator 222, a Tx Local Oscillator 223, and Tx Attenuator control 224, and the down converter including Rx Local Oscillator 225, Rx RF Multiplexer 226, Rx Variable Attenuator 227, and Rx Automatic Gain control 228.

First, referring to the radio frequency up converter, the Tx Local Oscillator 223 performs self-oscillating based on a 10 MHz base clock so as to generate a reference clock for generating a transmission RF frequency clock (e.g. 2.380 GHz). The Tx RF Multiplexer 221 up-converts the transmission IF signal up to a level of a transmission RF frequency generated in the Tx Local Oscillator 223. The Tx Variable Attenuator 222 adjusts an output level of a transmission signal according to a given value from the Ts Attenuator control 224. Conversely, referring to the radio frequency down converter, when the TRXU performs receiving, the Rx Local Oscillator 225 performs self-oscillating based on a 10 MHz of a basis clock to generate a reference clock and provides the same to the Rx RF Multiplexer 226, in order to enable the Rx RF Multiplexer 226 to adjust a signal of a reception RF frequency down to a level of a reception IF frequency. The Rx variable Attenuator 227 may adjust an input level of the reception IF signal using a value of the Rx Automatic Gain control 228. In this instance, the transmission RF frequency band and the reception RF frequency band are the same in the TDD mode.

Referring to FIG. 2, a transmission RF signal is amplified through the HPA 230 and transmitted to the RFFU 240. The RFFU 240 includes a Band Pass Filter 241, a Tx High Power Switch 242, a Tx switch control 243, a Low Noise Amplifier 244, a band Pass Filter 245, a Rx Low Power Switch 246, and a Rx switch control 247. Here, the Band Pass Filter 241 limits the transmission RF frequency to be suitable to a given measurement bandwidth, and transmits to the Tx High Power Switch 242. The Tx High Power Switch 242 has one input port and N number of output switching ports. The Tx High Power Switch 242 sequentially outputs the input transmission RF frequency to a corresponding switching port according to the Tx switch control 243, and transmits to a Duplex module 250. As oppose to the above, the Rx Low Power Switch 246 has N number of input ports ad one output port. The Rx Low Power Switch 246 selects one of the reception RF signals inputted through the N number of switching ports according to the Rx switch control 247, sequentially outputs the selected signal through the output port, and then limits a bandwidth of the output signal using the Band Pass Filter 245 and transmits to the Low noise Amplifier 244. In this instance, the Tx switch control 243 and the Rx switch control 247 are switching control signals, which are suitable to the TDD mode and received from the Timing control block 208.

The duplex module 250 is comprised of N number of Duplexer 251, and each of the N number of Duplexer 251 is one-to-one mapped and connected with N number of output switching ports of the Tx High Power Switch 242 and N number of input switching ports of the Rx Low Power Switch 246 in the RFFU 240. Also, each of N number of Duplexer 251 is one-to-one mapped and connected with N number of antenna of the N-Array Antenna 260, and the Duplexer 251 selectively selects a RF signal to be either transmitted or received through a multi-antenna according to a transmission or reception timing of the TDD mode.

Figure 3:
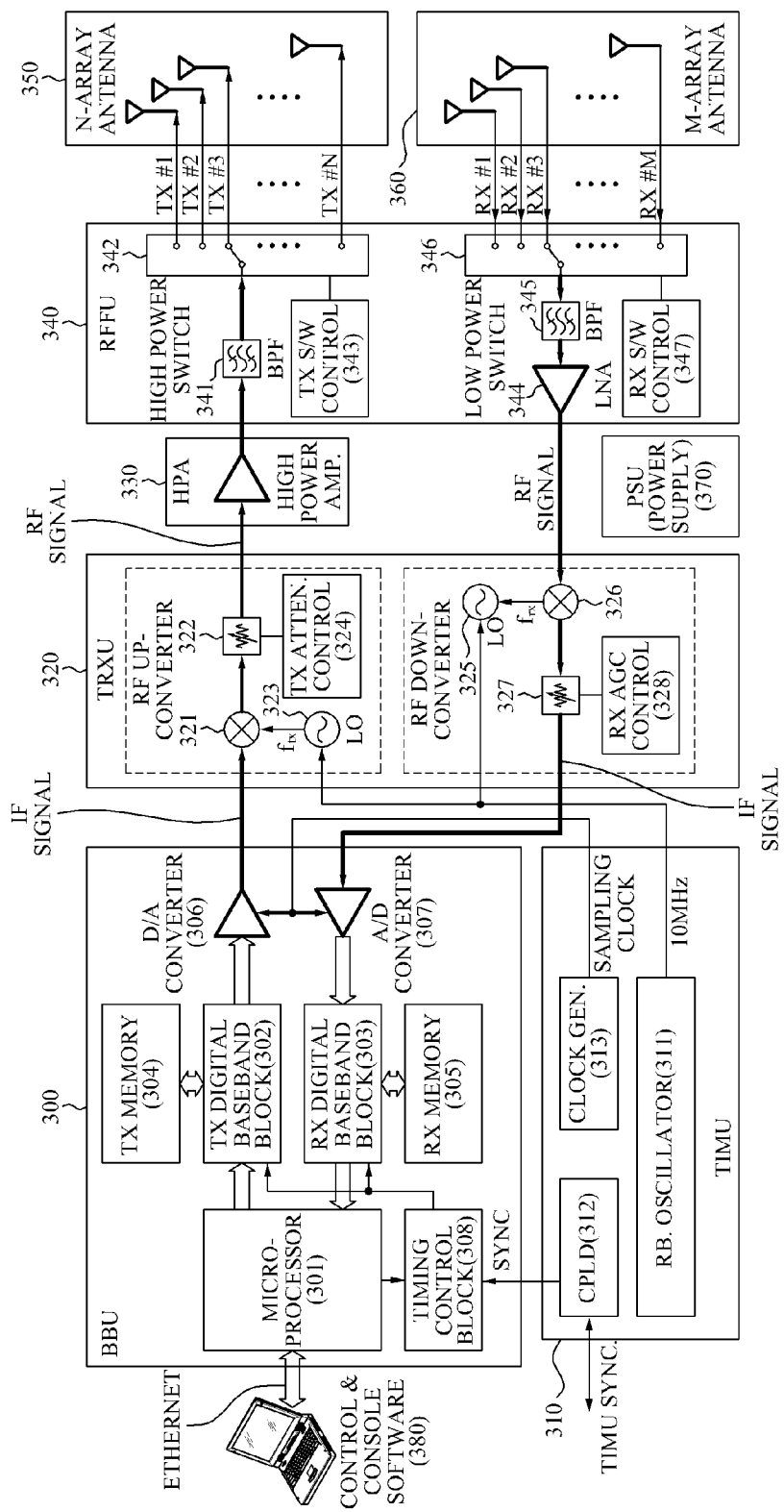
FIG. 3 illustrates a configuration of an apparatus when a two-way radio channel is measured in a Frequency Division Duplex (FDD) mode in a multi-antenna radio channel measurement system according to an example embodiment of the present invention.

FIG. 3 illustrates a configuration of an apparatus when a two-way radio channel is measured in a FDD mode in a multi-antenna radio channel measurement system according to an example embodiment of the present invention.

Referring to FIG. 3, the multi-antenna radio channel measurement system includes a BBU 300, a TIMU 310, a TRXU 320, a HPA 330, an RFFU 340, an N-array Antenna 350, an M-Array Antenna 360, a PSU 370, and Control & Console software 380.

Each apparatus illustrated in FIG. 3 operates identically or similarly to each apparatus having an identical name. Thus, a description for apparatuses which identically operates is omitted, and only different apparatuses and apparatuses which operate differently are described below.

As shown in FIG. 3, to operate the multi-antenna radio channel measurement system in the FDD mode, hardware configuration in the configuration of the measurement system operated in the TDD mode illustrated in FIG. 2 is required to be changed as follows.

First, the duplex module 250 of FIG. 2 is removed. An N number of output switching ports of a High Power switch 342 in the RFFU 340 of FIG. 3 is one-to-one mapped and connected with each antenna of the N-array Antenna 350 having N number of antennas, and an M number of input switching ports of a Low Power switch 346 in the RFFU 340 of FIG. 3 is one-to-one mapped and connected with each antenna of the M-Array Antenna 360 having M number of antennas.

Also, a Timing control block 308 is set to generate all the timing signals suitable to the FDD mode, and also a transmission RF frequency and a reception RF frequency are set to be different from each other when the measurement mode is the FDD.

Figure 4:
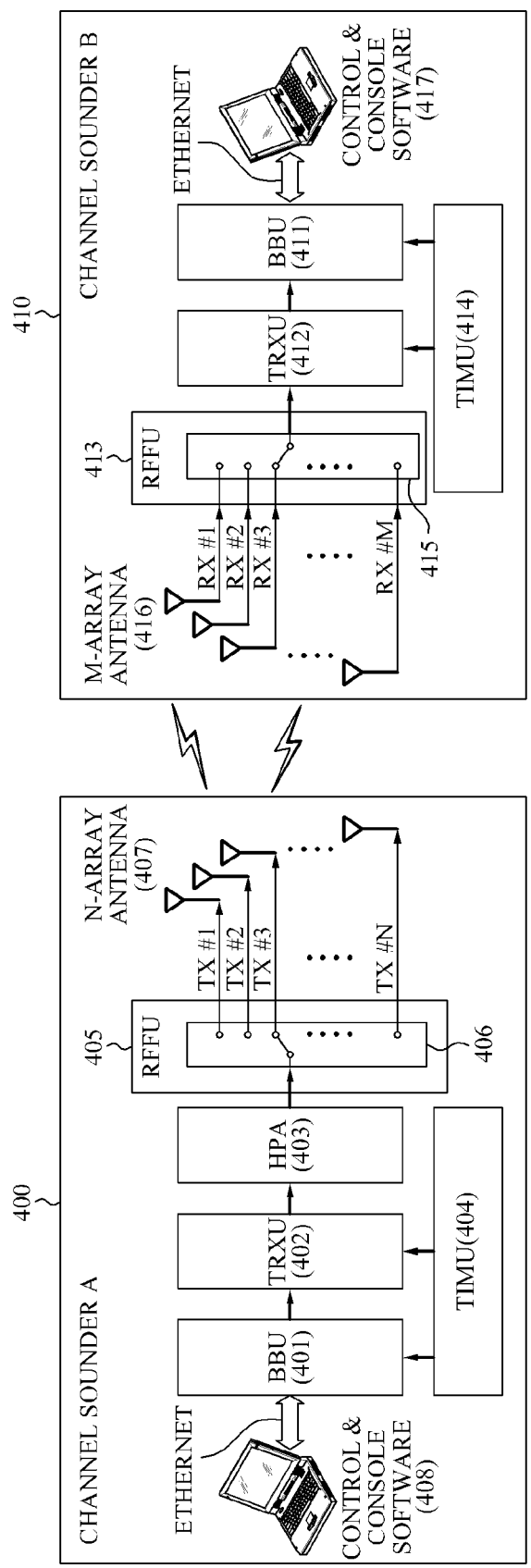
FIG. 4 illustrates a configuration of an apparatus when a simplex radio channel is measured in a multi-antenna radio channel measurement system according to an example embodiment of the present invention.

FIG. 4 illustrates a configuration of an apparatus when a simplex radio channel is measured in a multi-antenna radio channel measurement system according to an example embodiment of the present invention. Referring to FIG. 4, the multi-antenna radio channel measurement system is comprised of a transmission dedicated radio channel measurement system (Channel Sounder A) 400, reception dedicated radio channel measurement system (Channel Sounder B) 410. Here, the Channel Sounder A 400 includes a BBU 401, a TRXU 402, a HPA 403, a TIMU 404, an RFFU 405 including a Tx Antenna switch 406, an N-Array Antenna 407, and Control & Console Software 408.

Also, the Channel Sounder B 410 includes a BBU 411, a TRXU 412, a TIMU 414, an RFFU 413 including an Rx Antenna switch 415, an M-Array Antenna 416, and Control & Console Software 417.

To operate the multi-antenna radio channel measurement system in a simplex channel measurement mode, hardware configuration in the configuration of the measurement system operated in a FDD mode illustrated in FIG. 3 is required to be changed as following.

The M-Array Antenna 360 of FIG. 3 is removed to compose the transmission dedicated radio channel measurement system 400, and the N-Array Antenna 350 of FIG. 3 is removed to compose the reception dedicated radio channel measurement system 410.

Hereinafter, a method of measuring a radio channel by selecting either a two-way radio channel measurement mode or a simplex radio channel measurement mode in a multi-antenna radio channel measurement system according to the present invention (composed as described above) is described below referring to figures.

Figure 5:
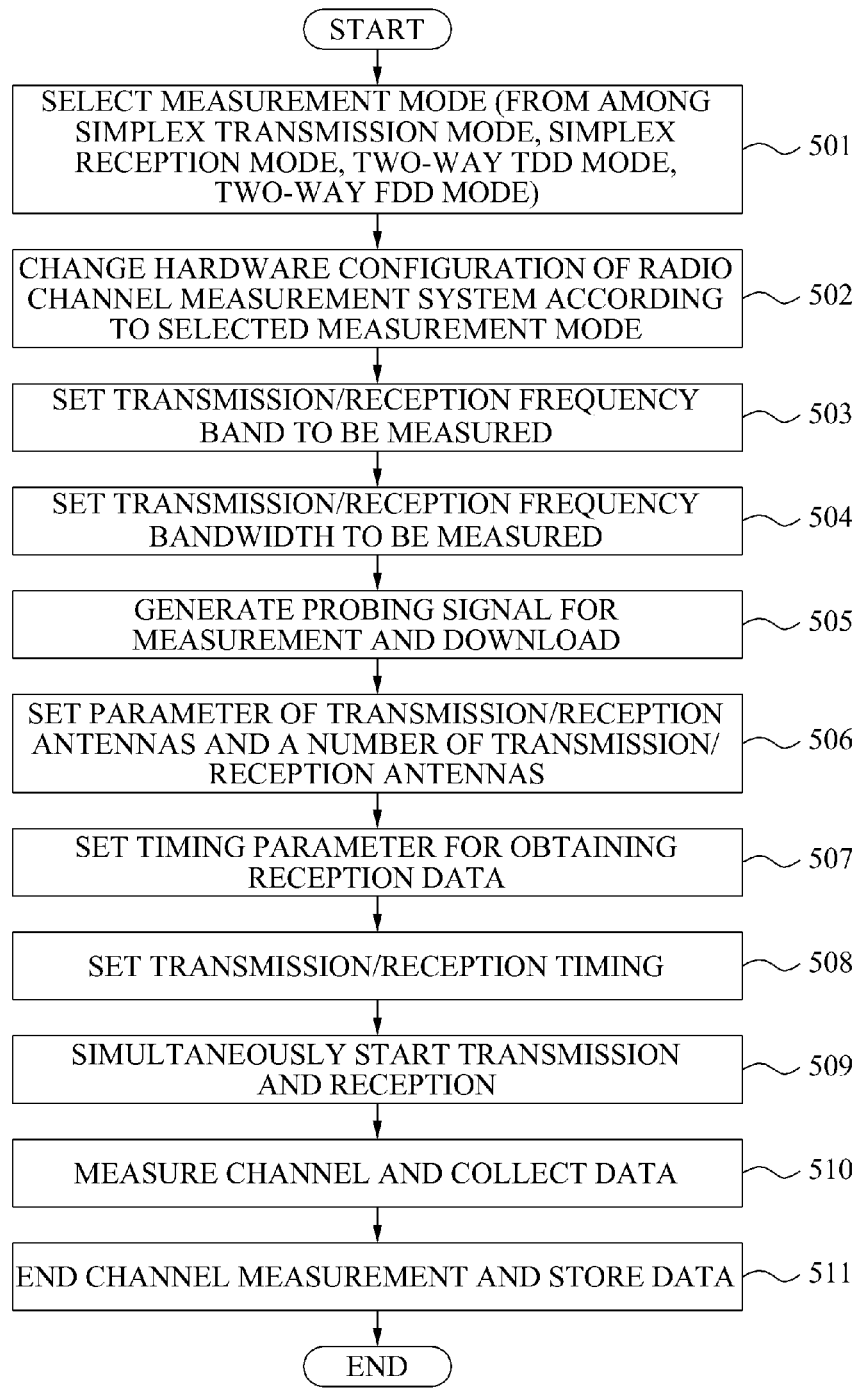
FIG. 5 is a flowchart illustrating a process of measuring a radio channel in a selected measurement mode in a multi-antenna radio channel measurement system according to an example embodiment of the present invention.

FIG. 5 is a flowchart illustrating a process of measuring a radio channel in a selected measurement mode in a multi-antenna radio channel measurement system according to an example embodiment of the present invention.

Referring to FIG. 5, the multi-antenna radio channel measurement system has a measurement mode selected, by Control & Console Software controlled by a user, from among a simplex transmission mode, a simplex reception mode, a two-way TDD mode, and a two-way FDD mode in operation 501, sets an apparatus configuration of the multi-antenna radio channel measurement system according to the selected measurement mode in operation 502, receives, from the Control & Console Software, a transmission/reception frequency band to be measured in consideration of the selected measurement mode and sets the transmission/reception frequency band in operation 503, receives a transmission/reception frequency bandwidth from the Control & Console Software and sets the transmission/reception frequency bandwidth in operation 504, receives a probing signal for measurement to be used in measurement from the Control & Console Software and stored the same in operation 505, and sets parameter of a transmission/reception antennas and a number of the transmission/reception antennas according to a scenario to be used in measurement in operation 506. In this instance, the transmission/reception parameter may include a type of antenna, such as a linear-array antenna or circular-array antenna, an element number of each antenna, and antenna array interval.

Next, the multi-antenna radio channel measurement system sets a timing parameter for obtaining reception data. In this instance, the timing parameter is a timing-related parameter needed for receiving a channel data based on a selected measurement mode and the number of transmission/reception antennas, such as a number of reception frames and interval.

Upon completing input a measurement mode and parameter needed for radio channel measurement in operations 501 to 507, the multi-antenna radio channel measurement system sets a transmission/reception timing of the radio channel system in operation 508, and starts transmission and reception in operation 509. In this instance, when the selected measurement mode is a simplex transmission mode, only transmission is started and when the mode is a simplex reception mode, only reception is started.

Next, the multi-antenna radio channel measurement system measures a channel or collects data while moving through a predetermined measurement path in operation 510, and stores the collected data when the channel measurement is ended. After that, an algorithm of the present invention is ended.

Figure 6:
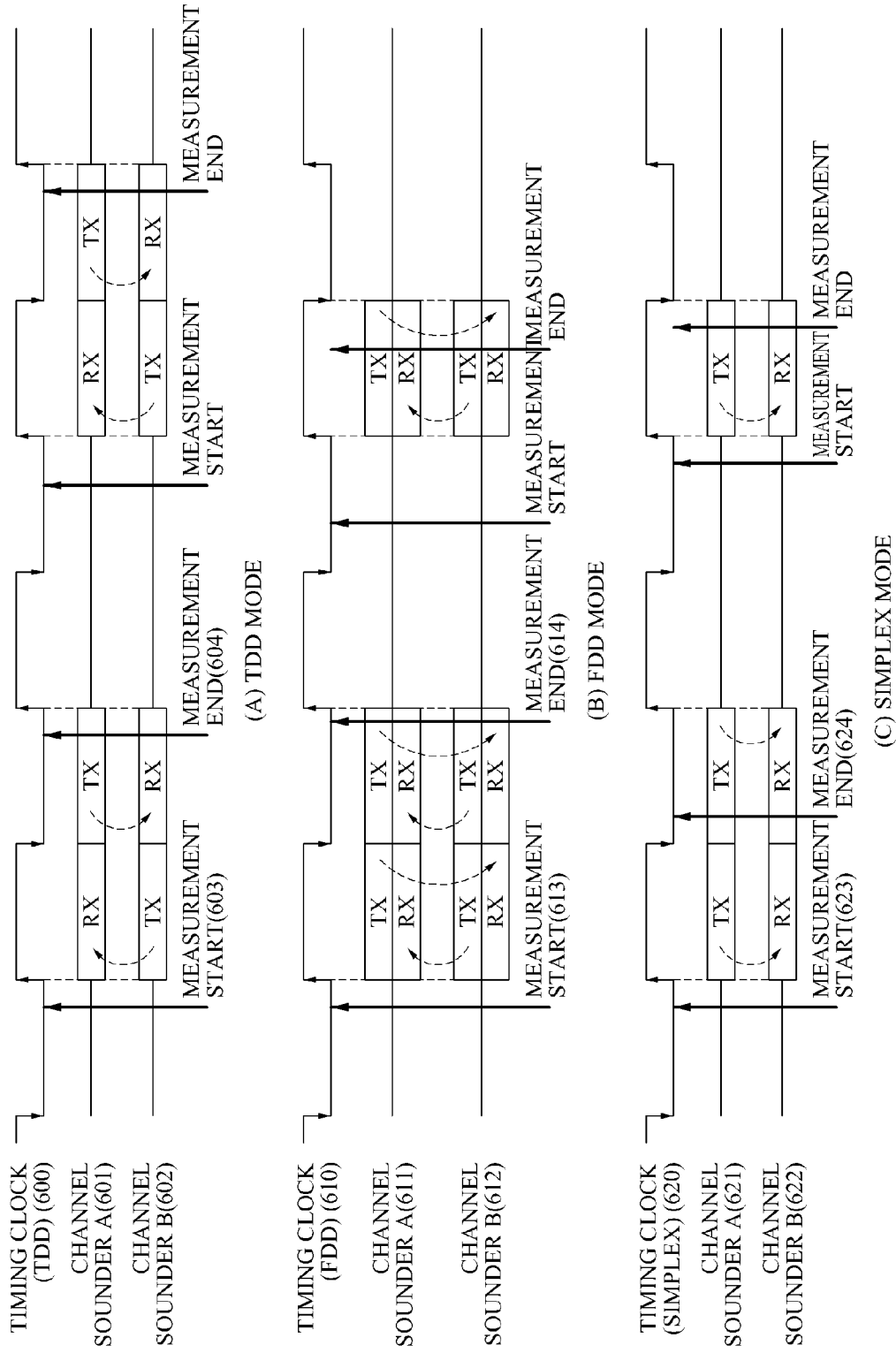
FIG. 6 illustrates timing of measurement modes which are supported in a multi-antenna radio channel measurement system according to an example embodiment.

FIG. 6 illustrates timing of measurement modes which are supported in a multi-antenna radio channel measurement system according to an example embodiment.

FIG. 6(a) illustrates timing in a TDD, wherein a timing clock 600, a transmission/reception time 601 in a Channel Sounder A, a transmission/reception time 602 in a Channel Sounder B are included. The Channel Sounder A 601 performs Rx operation in a High section of a Timing Clock 600 and performs Tx operation in a Low section of the Timing Clock 600 according to a measurement start signal 603. As opposed to the above, the Channel Sounder B 602 performs Tx operation in the High section of the Timing Clock 600 and performs Rx operation in the Low section of the Timing Clock 600 according to the measurement start signal 603. That is, when the Channel Sounder B 602 performs Tx operation, the Channel Sounder A 601 performs only Rx operation, and when the channel Sounder A 601 performs Tx operation, the Channel Sounder B 602 performs only Rx operation. Next, when there exists a measurement end signal 604, the Channel Sounder A 601 and the Channel Sounder B 602 stop Tx and Rx operations after completing ongoing respective operations, and repeat the above-mentioned operations when there exists a next measurement start signal.

FIG. 6(b) illustrates timing in a FDD, wherein a Timing Clock 610, a transmission/reception time 611 in a Channel Sounder A, a transmission/reception time 612 in a Channel Sounder B are included. The Channel Sounder A 611 and the Channel Sounder B 612 simultaneously performs Tx and Rx operations in a High or a Low section of the Timing clock 610. That is, data which transmitted from the Channel Sounder B 612 is received by the Channel Sounder A 611 at the same time, and simultaneously data which transmitted from the Channel Sounder A 611 is received by the Channel Sounder B 612. Next, when there exists a measurement end signal 614, the channel Sounder A 611 and the Channel Sounder B 612 stop their Tx and Rx operations after completing respective ongoing operations, and repeat the above-mentioned operations when there exists a next measurement start signal.

FIG. 6(c) illustrates timing in a simplex mode, wherein a Timing Clock 620, a transmission/reception time 621 in a Channel Sounder A, a transmission/reception time 622 in a Channel Sounder B are included. The Channel Sounder A 621 performs only Tx operation in a High or Low section of the Timing Clock 620 according to a measurement start signal 623, and the Channel Sounder B 622, at the same time, receives a data transmitted from the Channel Sounder A 621. Next, when there exists a measurement end signal 624, the Channel Sounder A 621 and the Channel Sounder B 622 stop their Tx and Rx operations after completing respective ongoing operations, and repeat the above-mentioned operations when there exists a next measurement start signal.

According to the present invention, there is provided a multi-antenna radio channel measurement system and method for a two-way radio channel measurement, including: Control & Console Software to select a radio measurement mode, generate a signal for measurement, receive input parameters to be measured, and deliver the parameters to BBU; a BBU to set a transmission/reception frequency band and bandwidth and set a timing using the selected radio measurement mode and the received input parameters so as to perform transmitting the probing signal for measurement and receiving a reception channel signal; a timing unit to synchronize a time with another radio channel measurement system to generate a transmission/reception synchronization signal, and provide the transmission/reception synchronization signal to the BBU; a TRXU to up-convert the probing signal for measurement and down-convert the reception channel signal; and a RFFU to switch to a suitable antenna according to a timing control signal of the BBU. Also, the present invention has an effect of supporting a simplex and also a two-way radio channel measurement according to a radio measurement mode.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended hereto and their equivalents.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents

The invention claimed is:

1. A multi-antenna radio channel measurement system for measuring a radio channel, comprising:
    Control & Console Software to select a radio measurement mode, generate a probing signal for measurement, receive input parameters to be measured, and deliver the parameters to a baseband unit (BBU);
    the BBU to set a transmission/reception frequency band and bandwidth and set a timing using the selected radio measurement mode and the received input parameters so as to perform transmitting the probing signal for measurement and receiving a reception channel signal;
    a timing unit to synchronize a time with another radio channel measurement system to generate a transmission/reception synchronization signal, and provide the transmission/reception synchronization signal to the BBU;
    a transceiver unit (TRXU) to up-convert the probing signal for measurement and down-convert the reception channel signal; and
    a radio frequency (RF) front-end unit (RFFU) to switch to a suitable antenna according to a timing control signal of the BBU,
    wherein the received input parameters include the transmission/reception frequency band and bandwidth, a length of the probing signal for measurement, a number of transmission antennas, a number of reception antennas, and a parameter for setting a timing.

2. The system of claim 1, wherein the selected radio measurement mode comprises a simplex transmission mode, a simplex reception mode, a two-way Time Division Duplex (TDD) mode, or a two-way Frequency Division Duplex (FDD) mode.

3. A multi-antenna radio channel measurement system for measuring a radio channel, comprising:
    Control & Console Software to select a radio measurement mode, generate a probing signal for measurement, receive input parameters to be measured, and deliver the parameters to a baseband unit (BBU);
    the BBU to set a transmission/reception frequency band and bandwidth and set a timing using the selected radio measurement mode and the received input parameters so as to perform transmitting the probing signal for measurement and receiving a reception channel signal;
    a timing unit to synchronize a time with another radio channel measurement system to generate a transmission/reception synchronization signal, and provide the transmission/reception synchronization signal to the BBU;
    a transceiver unit (TRXU) to up-convert the probing signal for measurement and down-convert the reception channel signal; and
    a radio frequency (RF) front-end unit (RFFU) to switch to a suitable antenna according to a timing control signal of the BBU,
    wherein, when the selected radio measurement mode is a Time Division Duplex (TDD) mode, the system further comprises:
    a duplex module to select a radio frequency signal to be either transmitted or received through a multi-antenna according to a timing control signal of transmission and reception.

4. A multi-antenna radio channel measurement system for measuring a radio channel, comprising:
    Control & Console Software to select a radio measurement mode, generate a probing signal for measurement, receive input parameters to be measured, and deliver the parameters to a baseband unit (BBU);
    the BBU to set a transmission/reception frequency band and bandwidth and set a timing using the selected radio measurement mode and the received input parameters so as to perform transmitting the probing signal for measurement and receiving a reception channel signal;
    a timing unit to synchronize a time with another radio channel measurement system to generate a transmission/reception synchronization signal, and provide the transmission/reception synchronization signal to the BBU;
    a transceiver unit (TRXU) to up-convert the probing signal for measurement and down-convert the reception channel signal; and
    a radio frequency (RF) front-end unit (RFFU) to switch to a suitable antenna according to a timing control signal of the BBU,
    wherein, when the selected radio measurement mode is a Time Division Duplex (TDD) mode, the BBU sets a transmission/reception frequency band and bandwidth to be identical and synchronizes time according to a generated timing control signal of the transmission and reception, and then alternately performs transmitting the signal for measurement and receiving a reception channel signal.

5. A multi-antenna radio channel measurement system for measuring a radio channel, comprising:
    Control & Console Software to select a radio measurement mode, generate a probing signal for measurement, receive input parameters to be measured, and deliver the parameters to a baseband unit (BBU);
    the BBU to set a transmission/reception frequency band and bandwidth and set a timing using the selected radio measurement mode and the received input parameters so as to perform transmitting the probing signal for measurement and receiving a reception channel signal;
    a timing unit to synchronize a time with another radio channel measurement system to generate a transmission/reception synchronization signal, and provide the transmission/reception synchronization signal to the BBU;
    a transceiver unit (TRXU) to up-convert the probing signal for measurement and down-convert the reception channel signal; and
    a radio frequency (RF) front-end unit (RFFU) to switch to a suitable antenna according to a timing control signal of the BBU,
    wherein, when the selected radio measurement mode is a Frequency Division Duplex (FDD) mode, the transmission of the signal for measurement and the reception of the reception channel signal are simultaneously performed through a transmission array antenna (N-Array Antenna) for transmission and a reception array antenna (M-Array Antenna) for reception.

6. A multi-antenna radio channel measurement system for measuring a radio channel, comprising:
   Control & Console Software to select a radio measurement mode, generate a probing signal for measurement, receive input parameters to be measured, and deliver the parameters to a baseband unit (BBU);
   the BBU to set a transmission/reception frequency band and bandwidth and set a timing using the selected radio measurement mode and the received input parameters so as to perform transmitting the probing signal for measurement and receiving a reception channel signal;
   a timing unit to synchronize a time with another radio channel measurement system to generate a transmission/reception synchronization signal, and provide the transmission/reception synchronization signal to the BBU;
   a transceiver unit (TRXU) to up-convert the probing signal for measurement and down-convert the reception channel signal; and
   a radio frequency (RF) front-end unit (RFFU) to switch to a suitable antenna according to a timing control signal of the BBU,
   wherein, when the selected radio measurement mode is a Frequency Division Duplex (FDD) mode, the BBU sets the transmission frequency band and the reception frequency band to be different from each other.

7. A method for measuring a radio channel in a multi-antenna radio channel measurement system comprising:
   setting a radio measurement mode by selection;
   receiving input parameters for measurement;
   setting a transmission/reception frequency band and bandwidth using the received input parameters;
   downloading and storing a probing signal for measurement;
   setting a transmission/reception timing using the received input parameters; and
   transmitting the signal for measurement and receiving and storing a reception channel signal according to the set transmission/reception timing.

8. The method of claim 7, wherein the received input parameters include the transmission/reception frequency band and bandwidth, a length of the probing signal for measurement, a number of transmission antennas, a number of reception antennas, and a parameter for setting a timing.

9. The method of claim 7, wherein the selected radio measurement mode comprises a simplex transmission mode, a simplex reception mode, a two-way Time Division Duplex (TDD) mode, or a two-way Frequency Division Duplex (FDD) mode.

10. The method of claim 7, wherein, when the selected radio measurement mode is a Time Division Duplex (TDD) mode, the setting of the transmission/reception frequency band and bandwidth comprises:
    setting the transmission/reception frequency band and bandwidth to be identical.

11. The method of claim 7, wherein, when the selected radio measurement mode is a Frequency Division Duplex (FDD) mode, the setting of the transmission/reception frequency band and bandwidth comprises:
    setting the transmission/reception frequency band and bandwidth to be different from each other.

* * * * *